US010628952B2

(12) United States Patent
Wan

(10) Patent No.: US 10,628,952 B2
(45) Date of Patent: Apr. 21, 2020

(54) DUAL-BAND STEREO DEPTH SENSING SYSTEM

(71) Applicant: Google LLC, Mountain View, CA (US)

(72) Inventor: Chung Chun Wan, San Jose, CA (US)

(73) Assignee: Google LLC, Mountain View, CA (US)

(*) Notice: Subject to any disclaimer, the term of this patent is extended or adjusted under 35 U.S.C. 154(b) by 164 days.

(21) Appl. No.: 15/837,961

(22) Filed: Dec. 11, 2017

(65) Prior Publication Data
US 2019/0180460 A1 Jun. 13, 2019

(51) Int. Cl.
G06T 7/593 (2017.01)
G02F 1/25 (2006.01)
G03B 15/05 (2006.01)
G03B 11/00 (2006.01)
H04N 13/254 (2018.01)
H04N 13/271 (2018.01)
(Continued)

(52) U.S. Cl.
CPC ............... G06T 7/593 (2017.01); G02F 1/25 (2013.01); G03B 11/00 (2013.01); G03B 15/05 (2013.01); H04N 13/239 (2018.05); H04N 13/254 (2018.05); H04N 13/271 (2018.05); H04N 5/33 (2013.01)

(58) Field of Classification Search
CPC combination set(s) only.
See application file for complete search history.

(56) References Cited

U.S. PATENT DOCUMENTS

2007/0247733 A1* 10/2007 Shiozawa ............... G02B 27/46
359/885
2010/0013860 A1* 1/2010 Mandella ............... G01B 21/04
345/650
(Continued)

FOREIGN PATENT DOCUMENTS

CN 1656465 8/2005
CN 103402110 11/2013
(Continued)

OTHER PUBLICATIONS

PCT International Search Report and Written Opinion issued in International Application No. PCT/US2018/048083, dated Nov. 23, 2018, 15 pages.
(Continued)

Primary Examiner — Md N Haque
(74) Attorney, Agent, or Firm — Fish & Richardson P.C.

(57) ABSTRACT

Methods, systems, and apparatus, including computer programs encoded on a computer storage medium, that determine whether to illuminate a scene with electromagnetic radiation at a first wavelength or electromagnetic radiation at a second wavelength. An illuminator that is configured to selectively emit electromagnetic radiation at the first wavelength and at the second wavelength is triggered to emit electromagnetic radiation at the first wavelength instead of the second wavelength. A first voltage is applied to a first electrically active filter. A third voltage is applied to a second electrically active filter. A first image is obtained from a first sensor that senses electromagnetic radiation that passes through the first filter. A second image is obtained from a second sensor that senses electromagnetic radiation that passes through the second filter. A depth map is generated from the first image and the second image.

19 Claims, 5 Drawing Sheets

(51) Int. Cl.
*H04N 13/239* (2018.01)
*H04N 5/33* (2006.01)

(56) References Cited

U.S. PATENT DOCUMENTS

| | | | | |
|---|---|---|---|---|
| 2012/0162370 | A1* | 6/2012 | Kim | G01B 11/02 |
| | | | | 348/46 |
| 2014/0293091 | A1 | 10/2014 | Rhoads et al. | |
| 2014/0307058 | A1 | 10/2014 | Kirk et al. | |
| 2016/0133659 | A1* | 5/2016 | Chao | H01L 27/14612 |
| | | | | 257/231 |
| 2016/0360074 | A1* | 12/2016 | Winer | H04N 5/2353 |
| 2017/0111557 | A1* | 4/2017 | Ko | G02B 5/208 |
| 2018/0299747 | A1* | 10/2018 | Liu | H04N 5/2254 |

FOREIGN PATENT DOCUMENTS

| | | |
|---|---|---|
| EP | 2560364 | 2/2013 |
| TW | 1598846 | 9/2017 |

OTHER PUBLICATIONS

TW Office Action in Taiwanese Appln. No. 107135199, dated Apr. 2, 2019, 7 pages (with English translation).

'phoneproscons.com' [online] "Google Pixel—Camera Advantage," Mar. 2017 [retrieved on Mar. 8, 2018] Retrieved from Internet: URL<https://phoneproscons.com/658/google-pixel/38/phase-detection-and-laser-detection-autofocus/> 4 pages.

'www.anandtech.com' [online] "Intel and Google Equip Smartphones with 3D Cameras and Computer Vision," Anton Shilov, Jan. 12, 2016, [retrieved on Mar. 7, 2018] Retrieved from Internet URL<https://www.anandtech.com/show/9940/intel-and-google-equip-smartphones-with-3d-cameras-and-computer-vision> 5 pages.

'www.extremetech.com' [online] "How Apple's iPhone X TrueDepth Camera Works," David Cardinal, Sep. 14, 2017, [retrieved on Mar. 8, 2018] Retrieved from Internet: URL<https://www.extremetech.com/mobile/255771-apple-iphone-x-truedepth-camera-works> 7 pages.

\* cited by examiner

DUAL-BAND STEREO DEPTH SENSING SYSTEM

BACKGROUND

Electronic devices sometimes include depth-sensing systems. Such a depth-sensing system may enable an electronic device to determine three-dimensional (3-D) features of an object that is located in front of the electronic device.

SUMMARY

This document describes techniques, methods, systems, and other mechanisms for provision of a dual-band stereo depth-sensing system. An example use of such a system is in a mobile computing device that utilizes the system to determine 3-D facial features of a person for facial recognition or face-tracking purposes.

A depth-sensing system may work by emitting electromagnetic radiation (EMR) at a particular wavelength, e.g., a wavelength corresponding to infrared light, on to a scene and using sensors that capture EMR that reflects from objects in the scene to determine a depth map of the scene. A scene may refer to what is in a field of view from the perspective of the sensors of the depth-sensing system.

For example, a stereo depth-sensing system may emit EMR at a wavelength of 850 nm, sense reflections of the emitted EMR off one or more physical objects using two sensors, and combine the sensed reflections from the two sensors into a depth map. A depth map generated by a depth-sensing system may portray distance of portions of the scene from the depth-sensing system.

Sensors of a depth-sensing system may be more sensitive to a particular wavelength and thus able to more accurately sense depth using EMR at that particular wavelength. However, the sensors may also be unable to distinguish emitted EMR that is then reflected off objects and EMR that are ambient to an environment. Accordingly, accuracy of a depth-sensing system may depend on environmental conditions. For example, when no sunlight is present, a depth-sensing system using EMR at a wavelength of 850 nm may produce more accurate results than a depth-sensing system using EMR at a wavelength of 940 nm. However, when sunlight is present, a depth-sensing system using EMR at a wavelength of 850 nm may produce less accurate results than a depth-sensing system using EMR at a wavelength of 940 nm.

A dual-band stereo depth-sensing system may combine the advantages of using two different wavelengths. For example, a dual-band stereo depth-sensing system may determine that sunlight is being sensed by sensors and, in response, determine to emit and sense EMR at a wavelength of 940 nm. In another example, the same dual-band stereo depth-sensing system may determine that sunlight is not being sensed by sensors and, in response, determine to emit and sense using EMR at the wavelength of 940 nm.

An example operation of the dual-band stereo depth-sensing system may begin with the depth-sensing system receiving an instruction to map the depth of a scene. In response, the depth-sensing system may analyze signals received from one or more sensors to determine that a limited amount of sunlight is present. As such, the depth-sensing system may select an operation mode including use of EMR at 850 nm.

In such an operation mode, the depth-sensing system may activate filters in each of two sensors so that the sensors pass through EMR at 850 nm and attenuate EMR at 940 nm. The depth-sensing system may then trigger its illuminator to output EMR at 850 nm. In such an operation mode, the illuminator may output relatively little EMR at 940 nm (or at least less EMR at 940 nm than if the depth-sensing system were in a 940 nm EMR operation mode). The EMR at 850 nm that is output by the illuminator may radiate into the scene, bounce off objects in the scene, and return to the two sensors that are activated to pass through such EMR at 850 nm. Each of the two sensors may then capture an image and the computing device may compute a depth map from the two images.

Such a system may provide increased accuracy by selecting an optimum wavelength of EMR for certain environmental conditions, all while the sensors may substantially filter out wavelengths other than the selected wavelength. The selected wavelength of EMR may not be visible to humans, and therefore the depth-sensing system may be able to ensure sufficient illumination of a scene without distracting a human user that may be present in the scene. As such, the system may select a preferred wavelength of non-visible EMR based on lighting properties at a given moment, and may toggle its illuminator to output and its sensors to sense at the selected wavelength. The system may operate at more than two wavelengths (e.g., five different wavelengths specific to different environment properties), and the wavelengths employed may be different than those described in this document.

The system may decrease power usage by selecting to emit at an optimum wavelength of EMR for current environmental conditions instead of emitting EMR at multiple wavelengths. For example, the illuminator may be capable of simultaneously emitting EMR at 850 nm and at 940 nm using a corresponding emitter for each wavelength. However, as reflected EMR at the wavelength that is not selected may be substantially filtered out by the sensors, the system may reduce power usage by avoiding emitting EMR at the unselected wavelength while emitting EMR at the selected wavelength.

Besides accuracy and power, the size and cost of a dual-band stereo depth-sensing system may also be an advantage. The dual-band stereo depth-sensing system may reduce the number of components used to generate a depth map by using electrically active filters that are able to selectively attenuate EMR at either 850 nm or 940 nm. Accordingly, instead of using two sensors that sense EMR at 850 nm and two separate sensors that sense EMR at 940 nm, the dual-band stereo depth-sensing system may use two sensors that have electrically active filters that are able to selectively attenuate EMR at 850 nm or 940 nm.

Additionally or alternatively, dual-band stereo depth-sensing system may use a rolling shutter sensor instead of a global shutter sensor. A rolling shutter sensor may be physically smaller than a global shutter sensor and may cost less than a global shutter sensor. The dual-band stereo depth-sensing system may perform a fast readout to reduce artifacts from the rolling shutter sensor. For example, to reduce distortions in moving objects caused by pixel rows being read out at different times, the dual-band stereo depth-sensing system may use a fast readout speed of $1/120$ of a second instead of $1/30$ of a second.

One innovative aspect of the subject matter described in this specification is embodied in a device that includes a first sensor including a first electrically active filter that is configured to (i) when a first voltage is applied to the first electrically active filter, pass through electromagnetic radiation at a first wavelength and attenuate electromagnetic radiation at a second wavelength, and (ii) when a second voltage is applied to the first electrically active filter, attenuate electromagnetic radiation at the first wavelength and pass through electromagnetic radiation at the second wavelength, a second sensor including a second electrically active filter that is configured to (i) when a third voltage is applied to the second electrically active filter, pass through electromagnetic radiation at the first wavelength and attenuate electromagnetic radiation at the second wavelength, and (ii) when a fourth voltage is applied to the second electrically active filter, attenuate electromagnetic radiation at the first wavelength and pass through electromagnetic radiation at the second wavelength, an illuminator configured to selectively emit electromagnetic radiation at the first wavelength and at the second wavelength, and electronic circuitry configured, in response to receiving an instruction to illuminate a scene and sense the scene with electromagnetic radiation at the first wavelength, to (a) trigger the illuminator to emit electromagnetic radiation at the first wavelength, (b) apply the first voltage to the first electrically active filter, and (c) apply the third voltage to the second electrically active filter.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects the electronic circuitry is configured to obtain a first image from the first sensor, obtain a second image from the second sensor, and generate a depth map from the first image and the second image. In some implementations, the electronic circuitry is configured to determine to illuminate the scene and sense the scene with electromagnetic radiation at the first wavelength instead of electromagnetic radiation at the second wavelength.

In certain aspects, the determining to illuminate the scene and sense the scene with electromagnetic radiation at the first wavelength instead of electromagnetic radiation at the second wavelength, includes determining that electromagnetic radiation at the second wavelength sensed by the first sensor satisfies a criterion. In some aspects, determining that electromagnetic radiation at the second wavelength sensed by the first sensor satisfies a criterion, includes determining that an amount of electromagnetic radiation at the second wavelength sensed by the first sensor is more than an amount of electromagnetic radiation at the first wavelength sensed by the first sensor.

In some implementations, determining to illuminate the scene and sense the scene with electromagnetic radiation at the first wavelength instead of electromagnetic radiation at the second wavelength, includes determining that the device is currently located outdoors. In certain aspects, the electronic circuitry is configured to obtain the first image from the first sensor simultaneously with obtaining the second image from the second sensor and trigger the illuminator to emit electromagnetic radiation at the first wavelength in synchrony with obtaining the first image and obtaining the second image.

In some aspects, the illuminator includes a first emitter that is configured to emit electromagnetic radiation at the first wavelength and a second emitter that is configured to emit electromagnetic radiation at the second wavelength. In some implementations, the first sensor includes a sensing element that is configured to sense electromagnetic radiation at both the first wavelength and the second wavelength. In certain aspects, the sensing element includes a rolling shutter sensing element. In certain aspects, the first sensor includes a notch filter between the sensing element and the first electrically active filter, where the notch filter is configured to attenuate electromagnetic radiation at wavelengths between the first wavelength and the second wavelength. In some implementations the first voltage and the third voltage are the same and the second voltage and the fourth voltage are the same.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
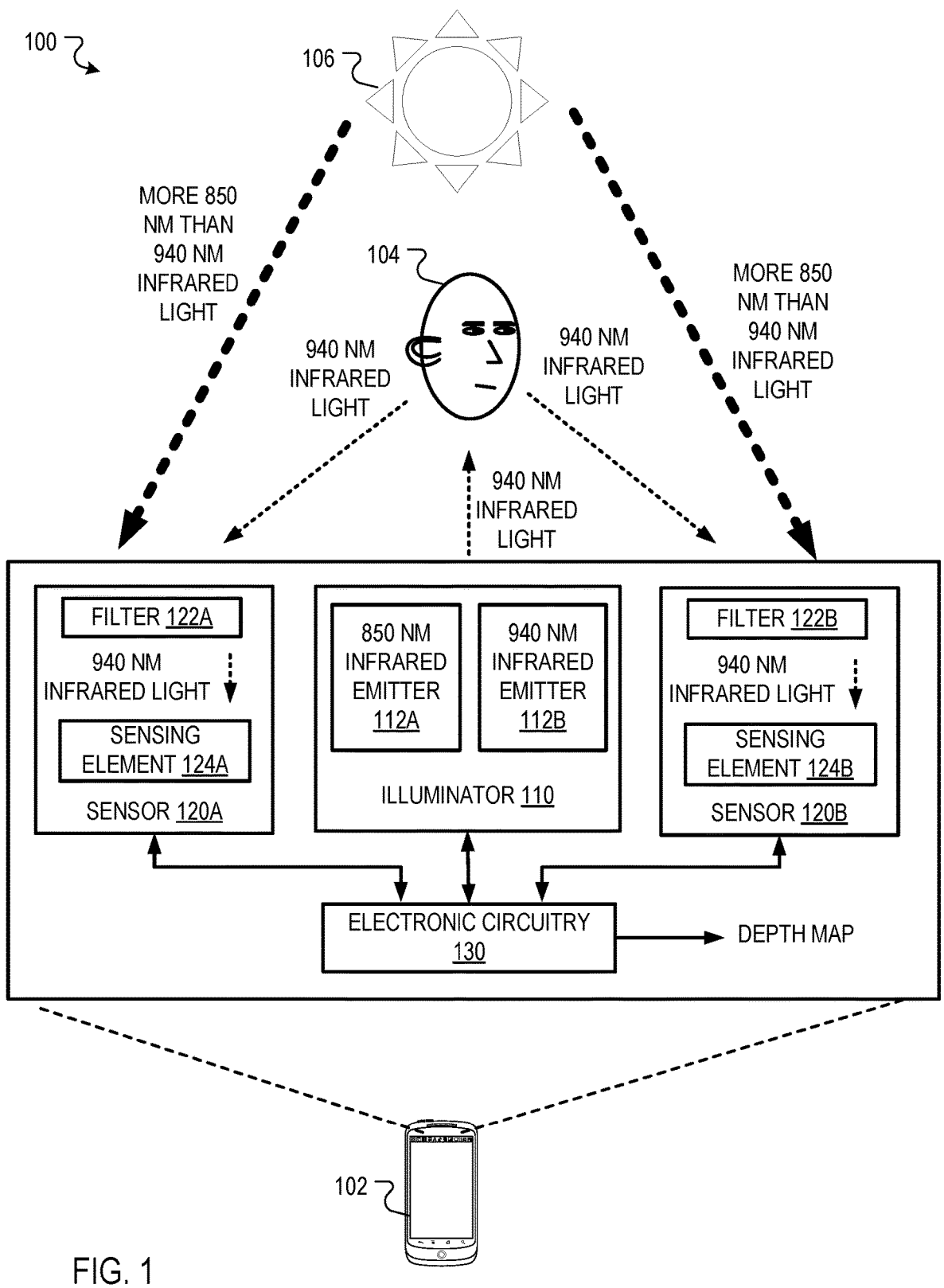
FIGS. 1 and 2 are conceptual diagrams of a dual-band stereo depth-sensing system.
Figure 2:
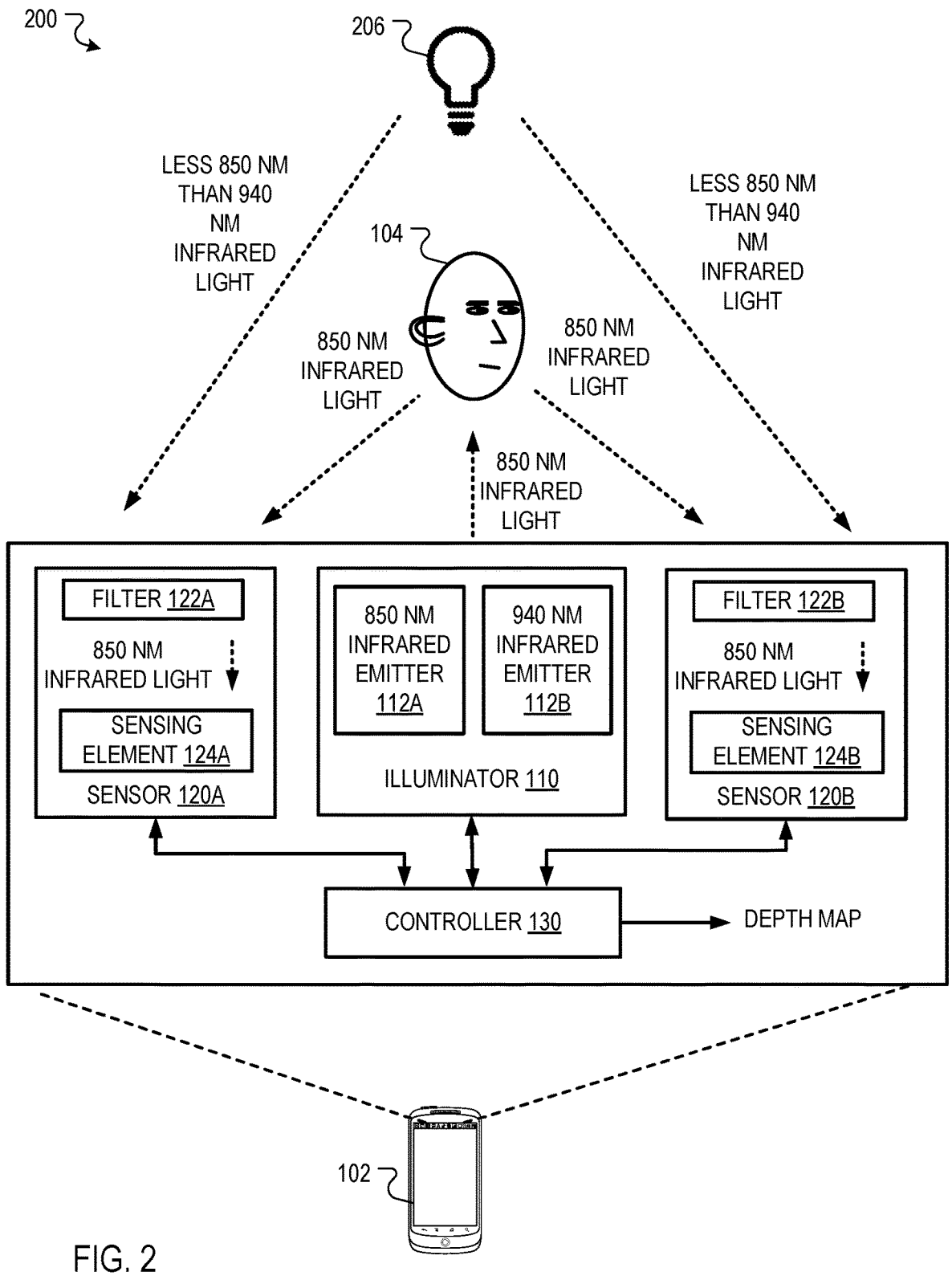

FIGS. 1 and 2 are conceptual diagrams of dual-band stereo depth-sensing systems 100 and 200. The systems 100 and 200 may be the same system operating using different wavelengths under different environmental conditions. FIG. 1 illustrates how the system 100 operates using EMR at a first wavelength under a first set of environmental conditions, e.g., determining a depth map that indicates facial features of a person 104 using 940 nm EMR while in the presence of ambient sunlight from the sun 106. FIG. 2 illustrates how the system 200 operates using EMR at a second different wavelength under a second different set of environment conditions, e.g., determining a depth map that indicates facial features of the person 104 using 850 nm EMR while in the presence of ambient light from an incandescent light bulb 206.

The systems 100 and 200 may operate using EMR at the first wavelength under the first set of environmental conditions, because using the first wavelength under the first set of environmental conditions may produce a more accurate depth map than using the second wavelength under the first set of environmental conditions. Conversely, the systems 100 and 200 may operate using EMR at the second wavelength under the second set of environmental conditions, because using the second wavelength under the second set of environmental conditions may produce a more accurate depth map than using the first wavelength under the second set of environmental conditions.

For example, when no sunlight is present, a depth-sensing system using EMR at 850 nm may produce more accurate results than a depth-sensing system using EMR at 940 nm. However, when sunlight is present, a depth-sensing system using EMR at 850 nm may produce less accurate results than a depth-sensing system using EMR at 940 nm.

The systems 100 and 200 may produce more accurate results at 850 nm when sunlight is not present and produce more accurate results at 940 nm when sunlight is present because the systems 100 and 200 may more accurately sense reflected EMR at 850 nm than EMR at 940 nm, but may be unable to distinguish whether sensed EMR is reflected from EMR that is emitted by the depth-sensing system or from ambient EMR, e.g., ambient sunlight.

As sunlight includes more EMR at the wavelength of 850 nm than EMR at the wavelength of 940 nm, the systems 100 and 200 may sense more noise in the form of EMR at 850 nm from sunlight than noise in the form of EMR at 940 nm from sunlight. Accordingly, in the presence of sunlight, the systems 100 and 200 may produce more accurate depth maps at 940 nm. Conversely, without the presence of sunlight, the systems 100 and 200 may produce more accurate depth maps at 850 nm.

In more detail, FIGS. 1 and 2 illustrate a mobile computing device 102 that includes an illuminator 110, a first sensor 120A, a second sensor 120B, and electronic circuitry 130. The illuminator 110, the first sensor 120A, the second sensor 120B, and the electronic circuitry 130 may be positioned above a display of the mobile computing device 102 as a user views a display from the front, as depicted in FIGS. 1 and 2.

The illuminator 110 includes a first emitter 112A that is configured to emit EMR at a first wavelength and a second emitter 112B that is configured to emit EMR at a second wavelength. For example, the first emitter 112A may be configured to emit much more EMR at 850 nm than EMR at 940 nm and the second emitter 112B may be configured to emit much more EMR at 940 nm than EMR at 850 nm. However, alternatively, the illuminator 110 may include a single emitter that is capable of selectively emitting at the first wavelength and the second wavelength.

The illuminator 110 may selectively emit EMR at the first wavelength or the second wavelength using the first emitter 112A and the second emitter 112B in response to instructions from the electronic circuitry 130. For example, the illuminator 110 may receive an instruction from the electronic circuitry 130 including a bit flag with a value of "0" and, in response, emit EMR at the first wavelength. In another example, the illuminator 110 may receive an instruction from the electronic circuitry 130 including a bit flag with a value of "1" and, in response, emit EMR at the second wavelength.

The illuminator 110 may include the first emitter 112A and the second emitter 112B on a single substrate and may include one or more lenses and one or more diffraction optical elements. The one or more lenses and one or more diffraction optical elements may form EMR emitted by the first emitter 112A and the second emitter 112B into a particular pattern. For example, the one or more lenses and one or more diffraction optical elements may form EMR into a grid pattern that is projected onto a scene.

The first sensor 120A and the second sensor 120B (collectively referred to as sensors 120) may be essentially identical but may be physically spaced apart so that different images sensed by the first sensor 120A and the second sensor 120B may be combined together as part of a stereo view. For example, the first sensor 120A may be positioned one millimeter to the left of the illuminator 110 and the second sensor 120B may be positioned one millimeter to the right of the illuminator 110, where the first sensor 120A, the second sensor 120B, and the illuminator 110 are arranged along a single straight line.

The sensors 120 may each include an electrically active filter 122A and 122B (collectively referred to as filters 122), respectively. The electrically active filter 122A may be configured to attenuate EMR at the first wavelength less than attenuating EMR at the second wavelength in response to a first voltage being applied to the electrically active filter 122A. For example, the electrically active filter 122A may be configured to pass through 95% of EMR at the first wavelength and pass through 2% of EMR at the second wavelength in response to 0.5 volts (V) being applied.

Additionally, the electrically active filter 122A may be configured to attenuate EMR at the first wavelength more than attenuating EMR at the second wavelength in response to a second voltage being applied to the electrically active filter 122A. For example, the electrically active filter 122A may be configured to pass through 2% of EMR at the first wavelength and pass through 95% of EMR at the second wavelength in response to 1 V being applied.

The electrically active filter 122B may behave similarly to the electrically active filter 122A, but may transition between filtering states in response to application of a third voltage instead of a first voltage and application of a fourth voltage instead of a second voltage. In some implementations, the third voltage may be the same as the first voltage and the fourth voltage may be the same as the second voltage. In some implementations, the electrically active filters 122 may be Fabry-Perrot filters.

The sensors 120 may include sensing elements 124A and 124B (collectively referred to as 124), respectively, that sense EMR that passes through the filters 122. For example, the sensing elements 124 may be rolling shutter sensors. In another implementation, the sensing elements 124 may be global shutter sensors. Rolling shutter sensors may be physically smaller and cost less than global shutter sensors. However, rolling shutter sensors may exhibit artifacts from reading out rows of pixels at different times. Accordingly the rolling shutter sensors may be configured to use a fast read out to reduce artifacts. For example, the rolling shutter sensors may use a read out of 1/120 seconds instead of 1/30 seconds. Global shutter sensors may be used in some examples.

The sensors 120 may additionally include a notch filter that attenuates EMR before the EMR reaches the sensing elements 124. For example, the sensors may include a notch filter between the electrically active filters 122 and the sensing elements 124. The notch filter may be configured to filter out EMR between the first wavelength and the second wavelength. For example, the notch filter may be configured to attenuate 95% of EMR between 860 nm and 930 nm and 2% of EMR at 850 nm and 2% of EMR at 940 nm.

The sensors 120 may filter and sense in response to instructions from the electronic circuitry 130. For example, the sensors 120 may receive an instruction to operate at a first wavelength and, in response, apply 0.5 V to the filters 122A. The sensors 120 may then receive an instruction from the electronic circuitry 130 to read out particular rows of pixels at particular times and, in response, provide data indicating sensed values for those rows of pixels at the particular times.

The electronic circuitry 130 may be configured to control the illuminator 110 and the sensors 120 to generate a depth map of a scene. The electronic circuitry 130 may be entirely in the form of hardware or a combination of hardware and software. For example, the electronic circuitry may include one or more processors and one or more computer-readable devices that include instructions that, when executed by the one or more processors, cause performance of operations. In controlling the illuminator 110 and the sensors 120, the electronic circuitry 130 may select whether to use a first wavelength or a second wavelength, and then instruct the illuminator 110 and the sensors 120 to use the first wavelength or the second wavelength.

For example, the electronic circuitry 130 may determine that more ambient EMR at 850 nm is present than ambient EMR at 940 nm and, in response, determine to operate at 940 nm. The electronic circuitry 130 may then activate the filters 122 in each of the two sensors 120 so that the sensors 120 pass through EMR at 940 nm and attenuate EMR at 850 nm. The electronic circuitry 130 may then trigger the illuminator 110 to output EMR at 940 nm. The illuminator 110 may output little EMR at 850 nm (or at least less EMR at 850 nm than if the system 100 was in an 850 nm EMR operation mode). The EMR at 940 nm that is output by the illuminator 110 may radiate into the scene, bounce off objects in the scene, and return to the two sensors 120 that are activated to pass through such EMR at 940 nm. Each of the two sensors 120 may then capture an image and the electronic circuitry 130 may compute a depth map from the two images.

In some implementations, the electronic circuitry 130 may obtain a first image from the first sensor 120A simultaneously with obtaining a second image from the second sensor 120B and may trigger the illuminator 110 to emit EMR at the first wavelength in synchrony with obtaining the first image and obtaining the second image. For example, the electronic circuitry 130 may trigger the illuminator 110 to emit EMR and the sensors 120 to sense EMR at a same frequency with a same phase. Obtaining the first image and second image simultaneously may ensure that the first image and second image are corresponding stereo images, because differences in the images may be used by the circuitry to identify differences in depth. Emitting the EMR in synchrony with sensing images may conserve power by not emitting EMR when the sensors are not outputting corresponding images.

Additional details regarding operations that may be performed by the electronic circuitry 130 are discussed below in regards to FIG. 3.

FIG. 1 particularly illustrates how the system 100 may operate at 940 nm in the presence of more ambient EMR at 850 nm than ambient EMR at 940 nm, e.g., ambient EMR from the sun 106. As shown in FIG. 1, the illuminator 110 emits EMR at 940 nm, the filters 122 attenuate ambient EMR at 850 nm and pass through EMR at 940 nm, and the electronic circuitry then generates a depth map from images sensed by the sensing elements 124 of EMR at 940 nm.

FIG. 2 particularly illustrates how the system 200 may operate at 850 nm in the presence of less ambient EMR at 850 nm than ambient EMR at 940 nm, e.g., ambient EMR from an incandescent light bulb 206. As shown in FIG. 2, the illuminator 110 emits EMR at 850 nm, the filters 122 attenuate ambient EMR at 940 nm and pass through EMR at 850 nm, and the electronic circuitry then generates a depth map from images sensed by the sensing elements 124 of EMR at 850 nm.

Figure 3:
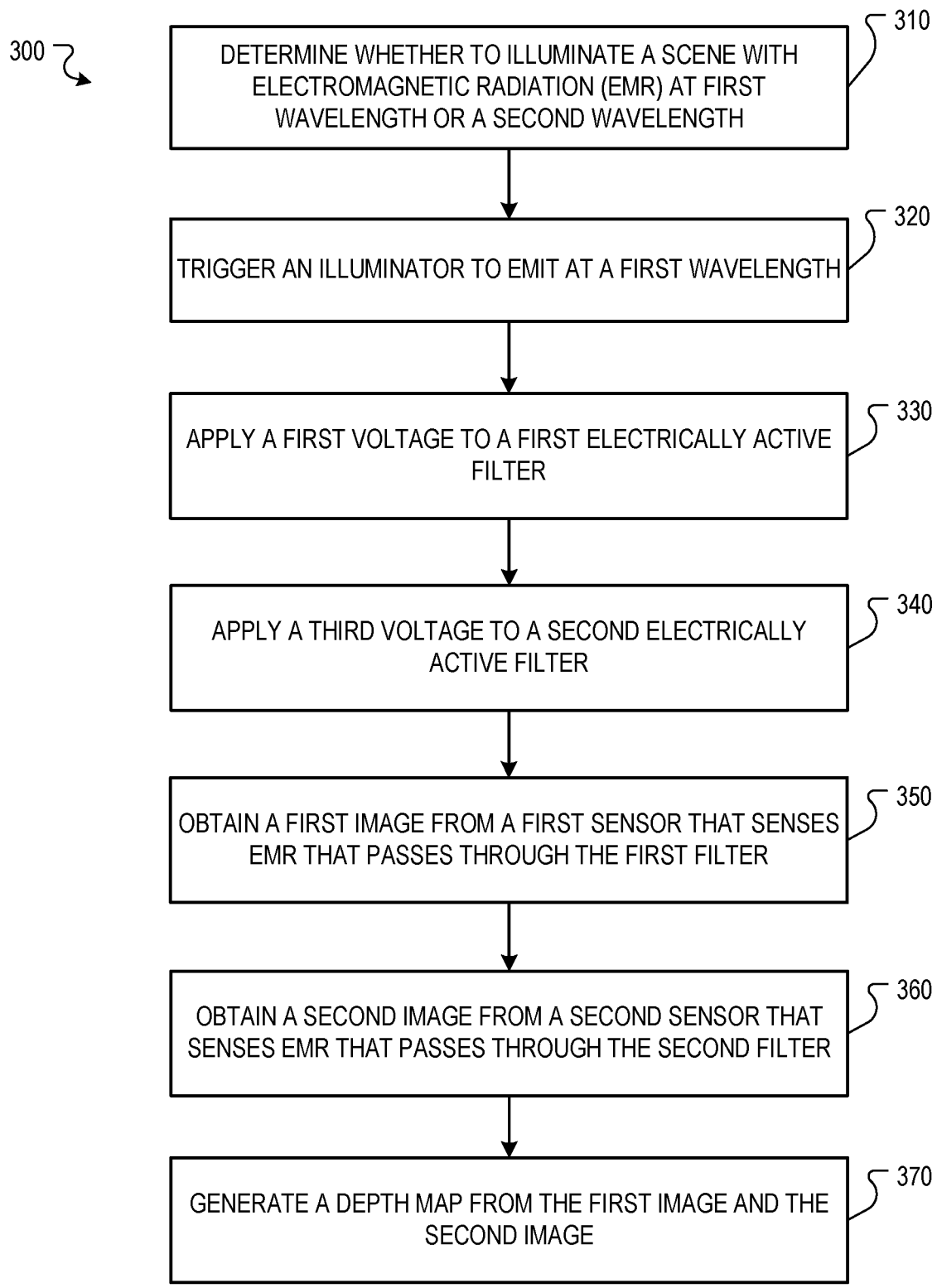
FIG. 3 is a flow diagram that illustrates an example of a process for dual-band stereo depth-sensing.

FIG. 3 is a flow diagram that illustrates an example of a process 300 for dual-band stereo depth-sensing. The operations of the process 300 may be performed by one or more electronic circuitry, such as the electronic circuitry 130 of FIGS. 1 and 2.

The process 300 includes determining whether to illuminate a scene with EMR at a first wavelength or EMR at a second wavelength (310). For example, the electronic circuitry 130 may determine to illuminate a scene using either EMR at 850 nm or EMR at 940 nm.

In some implementations, determining whether to illuminate a scene with electromagnetic radiation at a first wavelength or electromagnetic radiation at a second wavelength includes determining whether electromagnetic radiation at the second wavelength sensed by the first sensor satisfies a criteria. For example, the electronic circuitry 130 may determine that EMR at 850 nm sensed before the illuminator 110 emits EMR, i.e., ambient EMR at 850 nm, is above a threshold of three hundred Digital Number (DN) and, in response, determine to illuminate a scene using EMR at 940 nm.

In some implementations, determining whether electromagnetic radiation at the second wavelength sensed by the first sensor satisfies a criteria includes determining that an amount of electromagnetic radiation at the second wavelength sensed by the first sensor is more than an amount of electromagnetic radiation at the first wavelength sensed by the first sensor. For example, the electronic circuitry 130 may determine that EMR sensed at 850 nm before the illuminator 110 emits EMR is two hundred DN which is more than an amount of one hundred DN of EMR at 940 nm sensed before the illuminator 110 emits EMR and, in response determine to illuminate a scene using EMR at 940 nm.

In some implementations, determining whether electromagnetic radiation at the second wavelength sensed by the first sensor satisfies a criteria includes determining that a device including the first sensor is outdoors. For example, the electronic circuitry 130 may determine that, from global positioning satellite location information and detected sound from a microphone, the device 102 is outside and, in response determine to illuminate a scene using EMR at 940 nm.

In some implementations, determining whether to illuminate a scene with EMR at a first wavelength or EMR at a second wavelength is performed in response to determining to generate a depth map. For example, the electronic circuitry 130 may determine that a request for a depth map has been received from another portion of the device 102 and, in response, without emitting EMR with the illuminator 110, instruct the sensors 120 to sense EMR at 850 nm, then instruct the sensors 120 to sense EMR at 940 nm, determine whether less EMR was sensed at 850 nm or 940 nm, and then select to use the EMR at the wavelength for which less EMR was sensed.

The process 300 includes triggering an illuminator to emit at a first wavelength (320). For example, the electronic circuitry 130 may instruct the illuminator 110 to emit EMR at 940 nm using the second emitter 112B in response to determining to illuminate a scene with EMR at 940 nm.

The process 300 includes applying a first voltage to a first electrically active filter (330). For example, the electronic circuitry 130 may instruct the sensor 120A to sense at 940 nm or directly apply a voltage of 0.5 V to the filter 122A that causes the filter 122A to attenuate EMR at 850 nm more than the filter 122A attenuates EMR at 940 nm.

The process 300 includes applying a third voltage to a second electrically active filter (340). For example, the electronic circuitry 130 may instruct the sensor 120B to sense at 940 nm or directly apply a voltage of 0.5 V to the filter 122B that causes the filter 122B to attenuate EMR at 850 nm more than the filter 122B attenuates EMR at 940 nm.

The process includes obtaining a first image from a first sensor that senses EMR that passes through the first filter (350). For example, the electronic circuitry 130 may receive a sensed image from the sensor 120A.

The process includes obtaining a second image from a second sensor that senses EMR that passes through the second filter (360). For example, the electronic circuitry 130 may receive a sensed image from the sensor 120B.

The process includes generating a depth map from the first image and the second image (370). For example, the electronic circuitry 130 may determine portions of the first image and the second image that correspond to the same parts of a scene, determine distances that the parts of the scene are from the sensors, and then generate a depth map that indicates the determined distances. Generally, as the sensors 120 are physically separated, parts of a scene that are closer to the sensors 120 may be further apart in position from each other between the two images and parts of a scene that are further from the sensors 120 may be closer to each other in position between the two images. Accordingly, the electronic circuitry 130 may determine a first part of the first image corresponds with a second part of the second image, e.g., based on seeing they appear to be similar even though they appear to be in different positions between the image or seeing that they both include the same portion of a grid pattern projected by the illuminator 110. The electronic circuitry 130 may then determine a difference between a position of the first part from a position of the second part, and then determine a depth of the part of the scene that corresponds to the difference.

Figure 4:
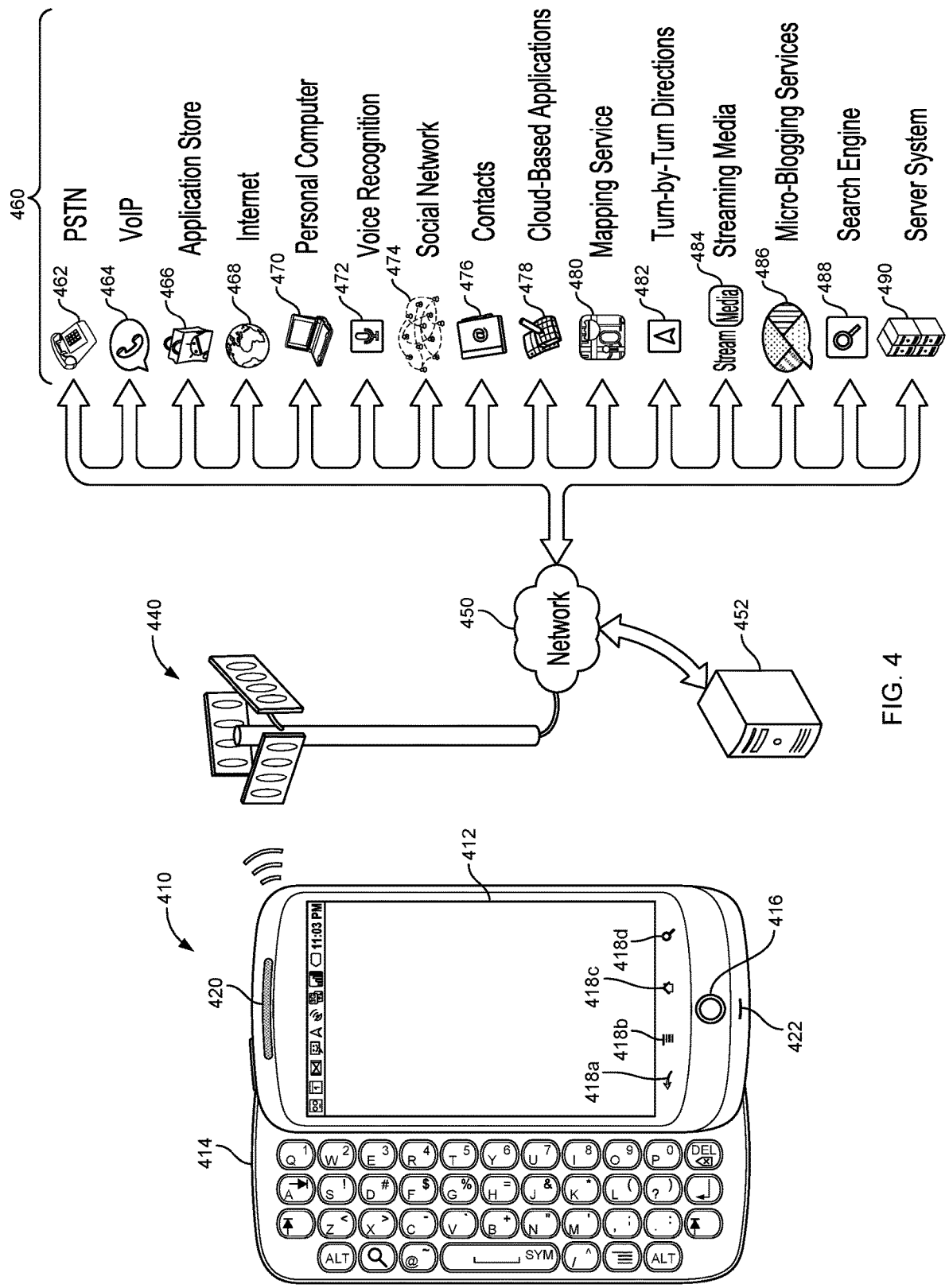
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 414. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
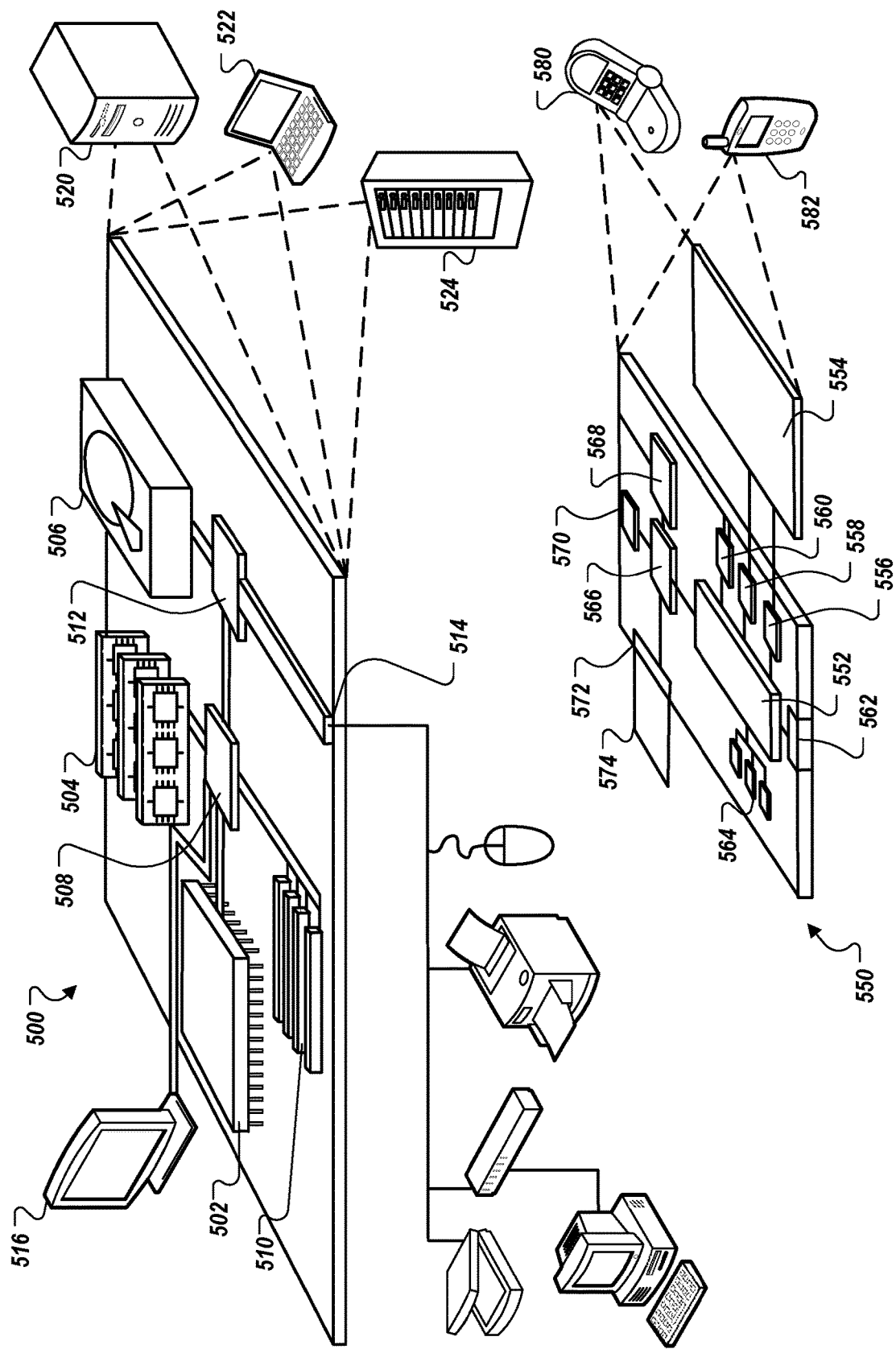
FIG. 5 is a block diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may be provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A device comprising:
a first sensor including a first electrically active filter that is configured to:
  (i) when a first voltage is applied to the first electrically active filter, pass through electromagnetic radiation at a first wavelength and attenuate electromagnetic radiation at a second wavelength, and
  (ii) when a second voltage is applied to the first electrically active filter, attenuate electromagnetic radiation at the first wavelength and pass through electromagnetic radiation at the second wavelength;
a second sensor including a second electrically active filter that is configured to:
  (i) when a third voltage is applied to the second electrically active filter, pass through electromagnetic radiation at the first wavelength and attenuate electromagnetic radiation at the second wavelength, and (ii) when a fourth voltage is applied to the second electrically active filter, attenuate electromagnetic radiation at the first wavelength and pass through electromagnetic radiation at the second wavelength;
an illuminator configured to selectively emit electromagnetic radiation at the first wavelength and at the second wavelength; and
electronic circuitry configured to:
in response to receiving an instruction to illuminate a scene and sense the scene, determine, based on environmental light conditions, whether to illuminate the scene and sense the scene with electromagnetic radiation with electromagnetic radiation at the first wavelength or electromagnetic radiation at the second wavelength,
in response to determining to illuminate the scene and sense the scene with electromagnetic radiation at the first wavelength:
(a) trigger the illuminator to emit electromagnetic radiation at the first wavelength,
(b) apply the first voltage to the first electrically active filter, and
(c) apply the third voltage to the second electrically active filter; and
in response to determining to illuminate the scene and sense the scene with electromagnetic radiation at the second wavelength:
(a) trigger the illuminator to emit electromagnetic radiation at the second wavelength,
(b) apply the second voltage to the first electrically active filter, and
(c) apply the fourth voltage to the second electrically active filter.

2. The device of claim 1, wherein the electronic circuitry is configured to:
obtain a first image from the first sensor;
obtain a second image from the second sensor; and
generate a depth map from the first image and the second image.

3. The device of claim 2, wherein the electronic circuitry is configured to:
obtain the first image from the first sensor simultaneously with obtaining the second image from the second sensor; and
trigger the illuminator to emit electromagnetic radiation at the first wavelength in synchrony with obtaining the first image and obtaining the second image.

4. The device of claim 1, wherein the determining to illuminate the scene and sense the scene with electromagnetic radiation at the first wavelength, comprises:
determining that electromagnetic radiation at the second wavelength sensed by the first sensor satisfies a criterion.

5. The device of claim 4, wherein determining that electromagnetic radiation at the second wavelength sensed by the first sensor satisfies a criterion, comprises:
determining that an amount of electromagnetic radiation at the second wavelength sensed by the first sensor is more than an amount of electromagnetic radiation at the first wavelength sensed by the first sensor.

6. The device of claim 1, wherein determining to illuminate the scene and sense the scene with electromagnetic radiation at the first wavelength, comprises:
determining that the device is currently located outdoors.

7. The device of claim 1, wherein the illuminator comprises a first emitter that is configured to emit electromagnetic radiation at the first wavelength and a second emitter that is configured to emit electromagnetic radiation at the second wavelength.

8. The device of claim 1, wherein the first sensor comprises a sensing element that is configured to sense electromagnetic radiation at both the first wavelength and the second wavelength.

9. The device of claim 8, wherein the sensing element comprises a rolling shutter sensing element.

10. The device of claim 8, wherein the first sensor comprises a notch filter between the sensing element and the first electrically active filter, wherein the notch filter is configured to attenuate electromagnetic radiation at wavelengths between the first wavelength and the second wavelength.

11. The device of claim 1, wherein the first voltage and the third voltage are the same and the second voltage and the fourth voltage are the same.

12. A computer-implemented method, comprising:
determining, based on environmental light conditions, whether to illuminate a scene with electromagnetic radiation at a first wavelength or electromagnetic radiation at a second wavelength;
in response to determining to illuminate the scene with electromagnetic radiation at the first wavelength:
triggering an illuminator that is configured to selectively emit electromagnetic radiation at the first wavelength and at the second wavelength to emit electromagnetic radiation at the first wavelength instead of the second wavelength;
applying a first voltage to a first electrically active filter that is configured (i) to pass through electromagnetic radiation at the first wavelength and attenuate electromagnetic radiation at the second wavelength when the first voltage is applied to the first electrically active filter, and (ii) to attenuate electromagnetic radiation at the first wavelength and pass through electromagnetic radiation at the second wavelength when a second voltage is applied to the first electrically active filter;
applying a third voltage to a second electrically active filter that is configured (i) to pass through electromagnetic radiation at the first wavelength and attenuate electromagnetic radiation at the second wavelength when a third voltage is applied to the second electrically active filter, and (ii) to attenuate electromagnetic radiation at the first wavelength and pass through electromagnetic radiation at the second wavelength when a fourth voltage is applied to the second electrically active filter;
obtain a first image from a first sensor that senses electromagnetic radiation that passes through the first filter;
obtain a second image from a second sensor that senses electromagnetic radiation that passes through the second filter; and
generate a depth map from the first image and the second image
determining, based on the environmental light conditions, whether to illuminate the scene with electromagnetic radiation at the first wavelength or electromagnetic radiation at the second wavelength;
in response to determining to illuminate the scene with electromagnetic radiation at the second wavelength:
triggering an illuminator that is configured to selectively emit electromagnetic radiation at the first wavelength and at the second wavelength to emit electromagnetic radiation at the second wavelength instead of the first wavelength;

applying the second voltage to the first electrically active filter;

applying the fourth voltage to the second electrically active filter;

obtain a third image from the first sensor that senses electromagnetic radiation that passes through the first filter;

obtain a fourth image from the second sensor that senses electromagnetic radiation that passes through the second filter; and generate a second depth map from the third image and the fourth image.

13. The method of claim 12, wherein determining whether to illuminate a scene with electromagnetic radiation at a first wavelength or electromagnetic radiation at a second wavelength, comprises:

determining whether electromagnetic radiation at the second wavelength sensed by the first sensor satisfies a criteria.

14. The method of claim 13, wherein determining whether electromagnetic radiation at the second wavelength sensed by the first sensor satisfies a criteria comprises:

determine that an amount of electromagnetic radiation at the second wavelength sensed by the first sensor is more than an amount of electromagnetic radiation at the first wavelength sensed by the first sensor.

15. The method of claim 13, wherein determining whether electromagnetic radiation at the second wavelength sensed by the first sensor satisfies a criteria comprises:

determining that a device including the first sensor is outdoors.

16. The method of claim 12, wherein the first image is obtained from the first sensor simultaneously with obtaining the second image from the second sensor; and the illuminator is triggered to emit electromagnetic radiation at the first wavelength in synchrony with obtaining the first image and obtaining the second image.

17. The method of claim 12, wherein the illuminator comprises a first emitter that is configured to emit electromagnetic radiation at the first wavelength and a second emitter that is configured to emit electromagnetic radiation at the second wavelength.

18. The method of claim 12, wherein the first sensor comprises a sensing element that is configured to sense electromagnetic radiation at both the first wavelength and the second wavelength.

19. A non-transitory computer-readable medium storing instructions executable by one or more computers which, upon such execution, cause the one or more computers to perform operations comprising:

determining, based on environmental light conditions, whether to illuminate a scene with electromagnetic radiation at a first wavelength or electromagnetic radiation at a second wavelength;

in response to determining to illuminate the scene with electromagnetic radiation at the first wavelength:

triggering an illuminator that is configured to selectively emit electromagnetic radiation at the first wavelength and at the second wavelength to emit electromagnetic radiation at the first wavelength instead of the second wavelength;

applying a first voltage to a first electrically active filter that is configured (i) to pass through electromagnetic radiation at the first wavelength and attenuate electromagnetic radiation at the second wavelength when the first voltage is applied to the first electrically active filter, and (ii) to attenuate electromagnetic radiation at the first wavelength and pass through electromagnetic radiation at the second wavelength when a second voltage is applied to the first electrically active filter;

applying a third voltage to a second electrically active filter that is configured (i) to pass through electromagnetic radiation at the first wavelength and attenuate electromagnetic radiation at the second wavelength when a third voltage is applied to the second electrically active filter, and (ii) to attenuate electromagnetic radiation at the first wavelength and pass through electromagnetic radiation at the second wavelength when a fourth voltage is applied to the second electrically active filter;

obtain a first image from a first sensor that senses electromagnetic radiation that passes through the first filter;

obtain a second image from a second sensor that senses electromagnetic radiation that passes through the second filter; and generate a depth map from the first image and the second image determining, based on the environmental light conditions, whether to illuminate the scene with electromagnetic radiation at the first wavelength or electromagnetic radiation at the second wavelength;

in response to determining to illuminate the scene with electromagnetic radiation at the second wavelength:

triggering an illuminator that is configured to selectively emit electromagnetic radiation at the first wavelength and at the second wavelength to emit electromagnetic radiation at the second wavelength instead of the first wavelength;

applying the second voltage to the first electrically active filter;

applying the fourth voltage to the second electrically active filter;

obtain a third image from the first sensor that senses electromagnetic radiation that passes through the first filter;

obtain a fourth image from the second sensor that senses electromagnetic radiation that passes through the second filter; and generate a second depth map from the third image and the fourth image.

* * * * *